(12) United States Patent
Tantoush et al.

(10) Patent No.: US 6,661,665 B2
(45) Date of Patent: Dec. 9, 2003

(54) METHOD AND APPARATUS FOR REMOVING HEAT FROM AN ELECTRONIC DEVICE

(75) Inventors: Mohammed A. Tantoush, Fremont, CA (US); Kenneth Kitlas, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/135,172

(22) Filed: Apr. 30, 2002

(65) Prior Publication Data

US 2003/0169567 A1 Sep. 11, 2003

Related U.S. Application Data

(60) Provisional application No. 60/363,216, filed on Mar. 11, 2002.

(51) Int. Cl.[7] .............................................. H05K 7/20
(52) U.S. Cl. ....................... 361/719; 165/80.3; 361/690; 454/184
(58) Field of Search .............................. 174/16.1, 16.3; 165/80.3, 121–126; 257/706, 707, 713, 721, 722, 723, 724; 361/687, 690, 692, 695, 697, 703, 709–712, 717–719; 454/184

(56) References Cited

U.S. PATENT DOCUMENTS

| | | | |
|---|---|---|---|
| 5,582,506 A | 12/1996 | Hong | |
| 5,584,339 A | 12/1996 | Hong | |
| 5,597,035 A | 1/1997 | Smith et al. | |
| 5,630,469 A * | 5/1997 | Butterbaugh et al. | 165/80.3 |
| 5,662,163 A | 9/1997 | Mira | |
| 5,946,190 A * | 8/1999 | Patel et al. | 361/700 |
| 6,031,720 A * | 2/2000 | Crane, Jr. et al. | 361/695 |
| 6,295,202 B1 * | 9/2001 | Tucker et al. | 361/704 |
| 6,352,103 B1 * | 3/2002 | Chu et al. | 165/80.3 |
| 6,438,984 B1 * | 8/2002 | Novotny et al. | 62/259.2 |
| 6,542,362 B2 * | 4/2003 | Lajara | |

OTHER PUBLICATIONS

USPGPUB 2003/0002254 A1, Faneuf, filed Jun. 29, 2001.*

* cited by examiner

*Primary Examiner*—Gerald Tolin
(74) *Attorney, Agent, or Firm*—Meyertons Hood Kivlin Kowert & Goetzel, P.C.; B. Noël Kivlin

(57) ABSTRACT

The electronic device with a system for enhancing the cooling of components located therein is provided. The device includes a housing with a fan positioned adjacent the housing and adapted for producing airflow within the housing. The printed circuit board is mounted within the housing, and a heat-producing device is mounted on the printed circuit board. The heatsink is coupled to the heat-producing device, and a shroud is mounted on the printed circuit board and extends up to the heatsink so as to improve airflow in the region adjacent the heatsink.

12 Claims, 5 Drawing Sheets

METHOD AND APPARATUS FOR REMOVING HEAT FROM AN ELECTRONIC DEVICE

PRIORITY DATA

This application claims the benefit of U.S. Provisional Patent Application Serial No. 60/363,216, filed on Mar. 11, 2002, by the instant inventors, which is incorporated herein in its entirety.

BACKGROUND OF THE INVENTION

1. Field of the Invention

This invention relates generally to reducing heat build-up in an electronic device, and, more particularly, to a structure for directing airflow over an electronic device.

2. Description of the Related Art

Generally, computer systems are comprised of a cabinet or housing that contains a plurality of components or subsystems, such as processors, memory, interfaces to various peripheral devices, a power supply, video systems, audio systems, disk drives, and the like. Each of these components generates some heat, and collectively, the computer system can generate substantial heat. In fact, many computer systems include various devices and systems to help remove excess heat from the cabinet so that the various electronic components located therein will not overheat and fail; or otherwise operate erratically. For example, many computer systems include a fan that operates to improve circulation through the cabinet or housing as a whole.

Further, individual components, such as a microprocessor, may produce substantial local heating. This local heating has been successfully dissipated by a heat sink mounted directly on the individual component. Typically, these heat sinks improve heat dissipation by increasing the effective surface area of the individual components. Some heat sinks include a plurality of fins that extend outward from the components. Thus, air from the fan flows over and between the fins, and cools the individual components.

As computer systems have become more complex and powerful, the individual components located therein have likewise become more powerful, and thus, have a greater density of electronic devices located therein. This increased density generally increases the amount of heat produced by the individual components. Increasing the number and size of the fins located on the heat sinks has generally provided increased cooling. Unfortunately, as the number of fins has increased, airflow provided by the fans has been inadequate to penetrate the now relatively dense fin structure, limiting its ability to cool the component.

Increasing the airflow to a sufficiently high level has proven problematic. Generally, fans are located adjacent an exterior surface of the cabinet, and thus, tend to be relatively remote from at least some of the components in need of cooling. Thus, airflow sufficient to provide the desired level of cooling to relatively remote components requires relatively large and/or high-speed fans. These fans tend to be noisy, consume substantial electrical power, and, because of their large size, consume valuable real estate in the computer system cabinet.

As a consequence, some computer systems have added a small auxiliary fan adjacent the overheating component. These auxiliary fans have provided some relief but they have created additional problems. For example, making the physical and electrical connections to the auxiliary fans has generally been a manual process, which adds to the cost and complexity of constructing the computer system. Moreover, the addition of these manual processes increases the possibility of errors in construction, and thus, reduces the overall reliability of the computer system. Further, with the growing complexity of modern computer systems, more and more individual components require additional cooling capacity. As the number of components that need cooling increases, the problems associated with installing auxiliary fans are compounded. That is, it is generally not cost effective or efficient to install a plurality of auxiliary fans.

SUMMARY OF THE INVENTION

In one aspect of the present invention, an apparatus for removing heat from a device mounted on a printed circuit board is provided. The apparatus is comprised of a heatsink coupled to the device and a shroud mounted on the printed circuit board. The shroud extends over the heatsink and has a generally polyhedron configuration with at least two openings positioned substantially opposite one another for directing airflow through the shroud and adjacent the heatsink.

In another aspect of the present invention, a cooling system is provided. The cooling system is comprised of a printed circuit board with at least one heat-generating device mounted on the printed circuit board. At least one heatsink is coupled to the heat-generating device, and a shroud is mounted on the printed circuit board and extends over the heatsink to substantially enclose the heatsink on at least three sides.

In still another aspect of the present invention, an electronic device is provided. The electronic device includes a housing with a fan positioned adjacent the housing and adapted for producing airflow within the housing. A printed circuit board is mounted within the housing, and a heat-producing device is mounted on the printed circuit board. A heatsink is coupled to the heat-producing device, and a shroud is mounted on the printed circuit board and extends over the heatsink to substantially enclose the heatsink on at least three sides.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
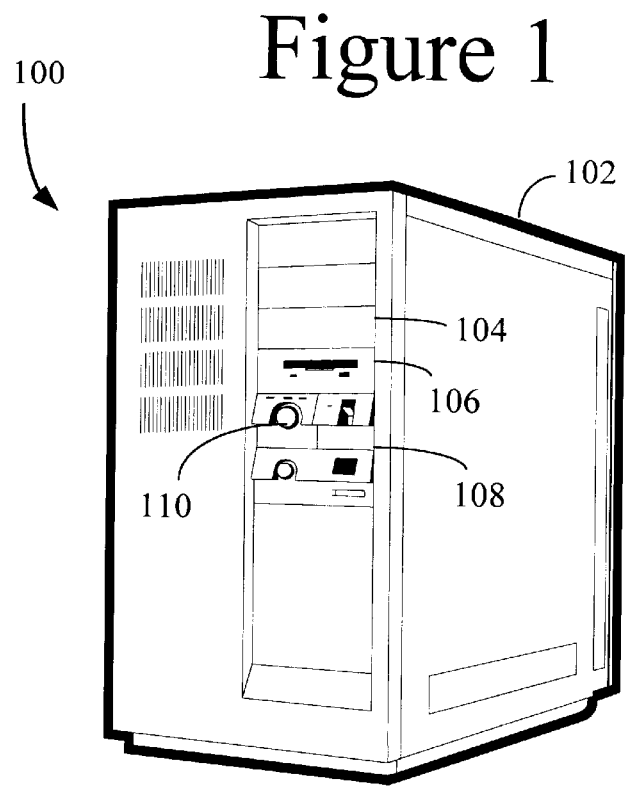
FIG. 1 illustrates a perspective view of one embodiment of a computer system that may advantageously employ one or more of the aspects of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Illustrative embodiments of a method and apparatus for improving airflow to select components in a computer system according to the present invention are shown in FIGS. 1–5B. As will be readily apparent to those skilled in the art upon a complete reading of the present application, the present method and apparatus are applicable to a variety of computer systems other than the embodiment illustrated herein, and moreover to electronic devices other than computer systems, including, but not limited to, logic devices, memory devices, and the like.

Turning now to FIG. 1, a perspective view of one embodiment of a general-purpose computer system 100, such as a personal computer or server that may advantageously employ one or more aspects of the present invention is shown. Generally, the computer system 100 is comprised of a housing, case, or cabinet 102, which contains a plurality of peripheral devices, such as a hard disk drive 104, a floppy disk drive 106, a CD-ROM 108, and the like. Additionally, the housing 102 may include external push buttons and/or switches 110 to control power and reset functions of the computer system 100.

Generally, included within the housing 102 are a plurality of components, such as caches, memory, input/output devices, a sound card, a video card, a modem, a network interface card, and the like. These components are coupled together via an architecture, which allows the components to efficiently communicate with one another and potentially with other external devices (not shown), such as other computer systems, printers, scanners, etc. The architecture may take on any of a variety of forms without departing from the scope of the instant invention.

Figure 2:
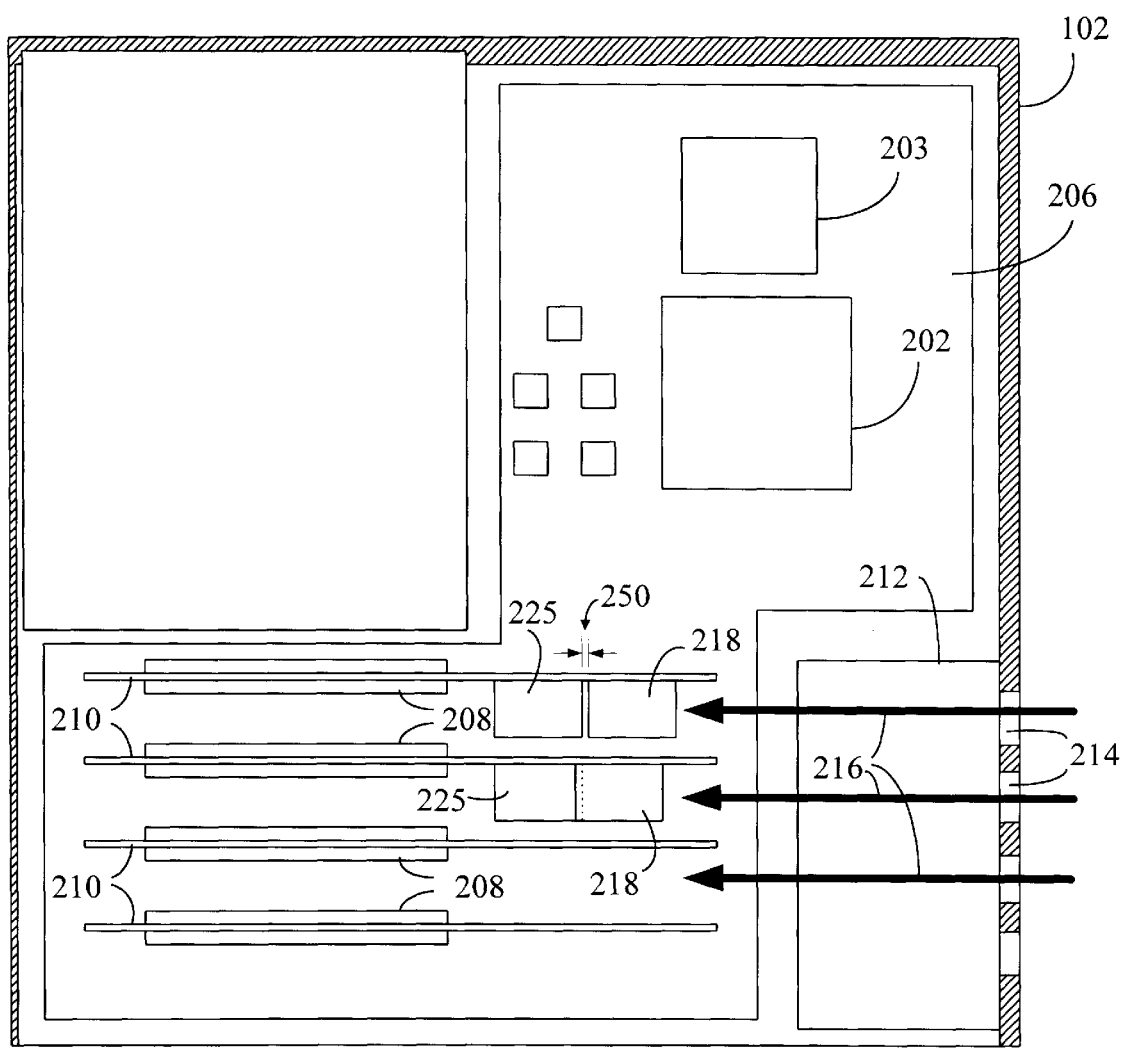
FIG. 2 schematically illustrates one embodiment of a stylized view of the computer system of FIG. 1 with a side cover removed.

FIG. 2 illustrates a stylized diagram of one embodiment of an internal physical arrangement of the computer system 100 that may advantageously employ one or more aspects of the present invention. The computer system 100 may comprise a central processing unit (CPU) or microprocessor 202, such as UltraSPARC™ or microSPARC™ microprocessors commercially available from Sun Microsystems, Inc. In the illustrated embodiment, the CPU 202 has at least one, and in some cases more than one, type of memory 203 associated with it. The memory 203 may take the form of dynamic random access memory (DRAM), a cache, both, multiple levels of each, or some combination thereof. Generally, the CPU 202 uses the memory 203 during normal operation for temporary storage of data and/or instructions.

In the illustrated embodiment, the CPU 202 and the memory 203 are physically located on a printed circuit board 206 that is often referred to as a main circuit board or a motherboard. The CPU 202 and the memory 203 are electrically coupled together by a plurality of traces or electrical lines commonly called buses (not shown) extending on or through the motherboard 206. The type of bus may include a peripheral component interface (PCI) bus, an industry standard architecture (ISA) bus, a processor bus (JBUS), a custom bus, or the like.

These buses also extend to a plurality of edge connectors 208 that are mounted on the motherboard 206. The edge connectors 208 are conventional in construction and are adapted to be physically and electrically coupled to auxiliary printed circuit boards 210. The printed circuit boards 210 may be used to provide additional functionality to, or to enhance the functionality of, the computer system 100. That is, the printed circuit boards 210 may be of a type designed to furnish original or additional capabilities, such as graphics processing, sound processing, interfacing to devices having specialized communications requirements, and the like.

The printed circuit board 210, when installed in the edge connectors 208, lies in a plane that extends generally perpendicular from the motherboard 206. Additionally, the printed circuit boards 210 are generally parallel to one another and spaced apart by a pre-selected distance. To provide cooling to components (not shown in FIG. 2) located on the printed circuit boards 210, a conventional system fan 212 is mounted adjacent the housing 102 and generally aligned with openings 214 that extend through the housing 102. Thus, the fan 212 urges air to flow (represented by arrows 216) into or out of the housing 102. The fan 212 and its mounting arrangement are of a conventional construction, and thus, are not discussed in greater detail herein so as to avoid unnecessarily obscuring the instant invention. In fact, any of a wide variety of fans or airflow generating devices may be readily employed without departing from the scope of the instant invention.

The airflow 216 circulates throughout the housing 102, and in the process passes between the printed circuit boards 210. Historically, this system of providing airflow has proven adequate to cool the computer system 100. However, as the complexity, density, and resulting heat production of various components in the computer system 100 has increased, so too has the need for cooling these components. For example, as the complexity of the CPU (or microprocessor) 202 has increased, the resulting increase in heat generated by the CPU (or microprocessor) 202 has been removed by the addition of heatsinks and fans (not shown) mounted directly on or near the CPU (or microprocessor) 202. Similar increases in complexity and heat production have also occurred in components mounted on the printed circuit boards 210. However, owing to the spacing between the printed circuit boards 210, a conventional heatsink and fan arrangement of sufficient size and cooling capacity may not be physically located therebetween. Moreover, it may not be economically feasible to locate an individual fan on each component that requires enhanced cooling, especially as more complex systems are constructed on the printed circuit boards 210.

One aspect of the instant invention utilizes an airflow guide or shroud 218 mounted on the printed circuit board 210 to enhance or direct airflow in a localized region adjacent the shroud 218, including over or through one or more heatsinks 225 (304, 306 shown in FIGS. 3A–5B), viewed here from above. Thus, locating the shroud 218 adjacent a component in need of additional cooling may advantageously result in increased airflow and attendant enhanced cooling.

In the illustrated embodiment, one printed circuit board 210 includes the shroud 218 spaced a distance 250 from the heatsinks 225. The adjacent printed circuit board 210 includes the shroud 218 extending over at least a portion of the heatsinks 225. A more detailed view of the shroud 218 may be had by reference to FIG. 3A, which illustrates an exploded perspective view of the printed circuit board 210 and the shroud 218, and to FIG. 3B, which illustrates a side view of the printed circuit board 210 and the shroud 218.

Figure 3A:
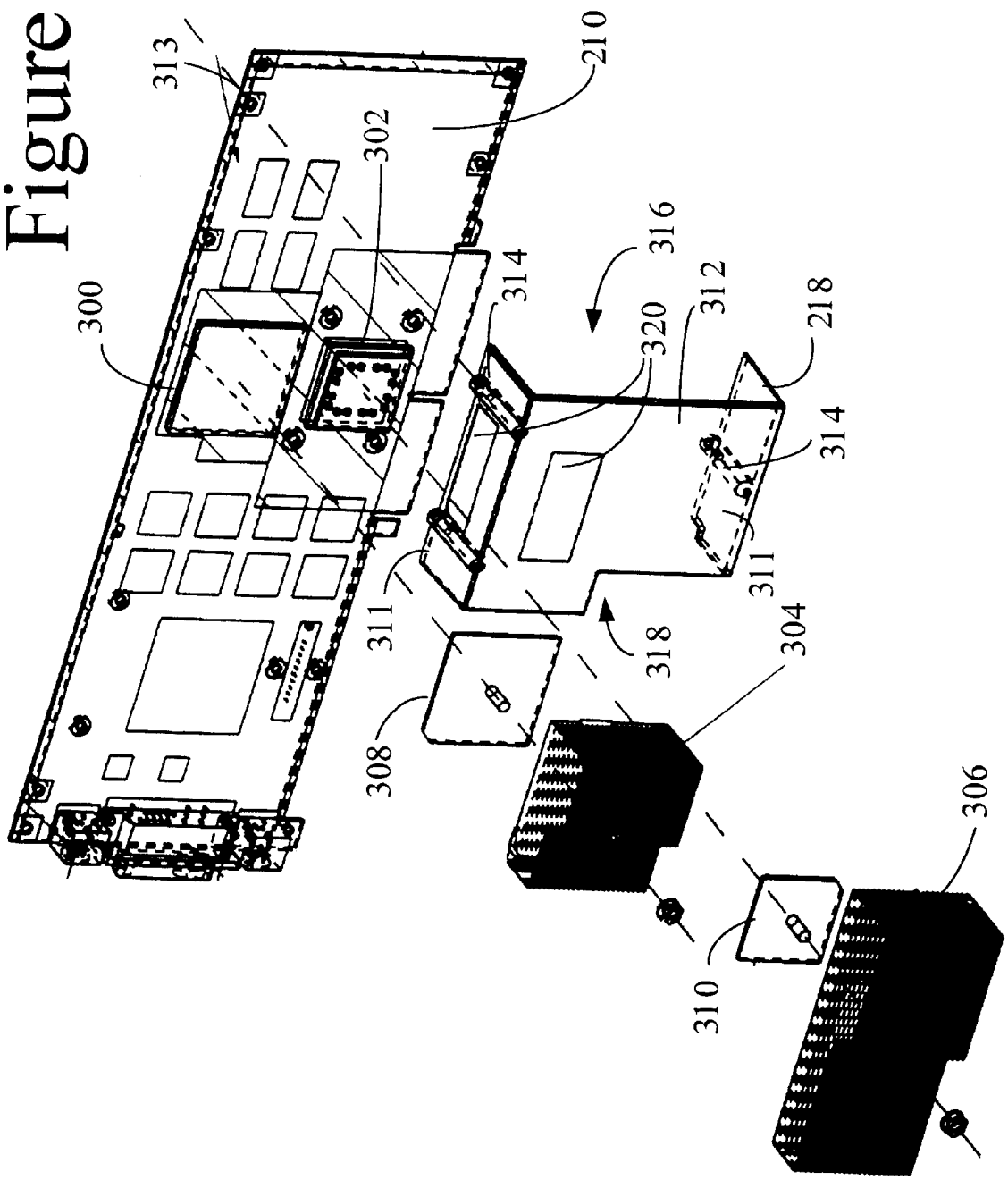
FIG. 3A schematically illustrates an exploded perspective view of one embodiment of a printed circuit board of FIG. 2.

Referring to FIG. 3A, the illustrated embodiment of the printed circuit board 210 includes a plurality of devices mounted thereon, including semiconductor devices 300, 302. In the illustrated embodiment, the semiconductor devices 300, 302 comprise a digital signal processor and a graphics processor. However, the instant invention is not so limited. Rather, the instant invention has application to any of a variety of electronic devices that generate heat and, thus, require cooling.

In the illustrated embodiment, a pair of heatsinks 304, 306 are coupled to the semiconductor devices 300, 302 via post assemblies 308, 310. Those skilled in the art will appreciate that the heatsinks 304, 306 may take on any of a variety of configurations and may be coupled to the semiconductor devices 300, 302 by a variety of mechanisms. A more detailed description of one mounting mechanism for coupling the heatsinks 304, 306 with the semiconductor devices 300, 302 is shown and discussed below in conjunction with FIGS. 5A and 5B.

The shroud 218 has a generally open-ended box-like configuration, such as a polyhedron or parallelepiped geometry, that extends up to the heatsinks 304, 306. That is, the shroud 218 includes a pair of sidewalls 311 joined by a top surface 312. In the illustrated embodiment, the sidewalls 311 and top surface 312 are generally planar, but other configurations are envisioned. The shroud 218 is mounted to the printed circuit board 210 via conventional coupling mechanisms, such as screws, rivets, push pins, bolts, welding, gluing, and the like. In the illustrated embodiment, screws (325 shown in FIG. 3B) pass through openings 313 in the printed circuit board 210 and interact with boreholes formed in enlarged regions 314 of the sidewalls.311 1 of the shroud 218. The sidewalls 311 are relatively thin, such that the enlarged regions 314 are useful in providing an attachment point for the screws (325 shown in FIG. 3B).

Generally, the heatsinks 304, 306 are enclosed on three sides. In the illustrated embodiment, the shroud 218 does not have sidewalls adjacent end portions 316, 318 such that airflow is allowed to pass therethrough. It should be appreciated that air flowing through the shroud 218 via the open-end portions 316, 318 also passes over and through the heatsinks 304, 306. Those skilled in the art will appreciate that the end walls adjacent end portions 316, 318 need not be entirely absent, but rather, may have openings formed therein to allow airflow through the shroud 218 towards the heatsinks 304, 306. Note that while the illustrated heatsinks 304, 306 are conventional finned heatsinks, other types of heatsinks with a variety of characteristic dimensions are contemplated.

The shroud 218 may be formed from any of a variety of materials, such as relatively rigid plastics, organic plastics, metal, paper products, and the like. In the illustrated embodiment, the shroud 218 is formed from a plastic, which has been injection molded to the basic configuration illustrated herein. Relatively flat and smooth regions 320 have been provided on at least a portion of an outer surface of the shroud 218 to provide a convenient and visible location in which to display relevant information regarding select properties of the printed circuit board 210, the semiconductor devices 300, 302 located thereon, or the like.

Figure 3B:
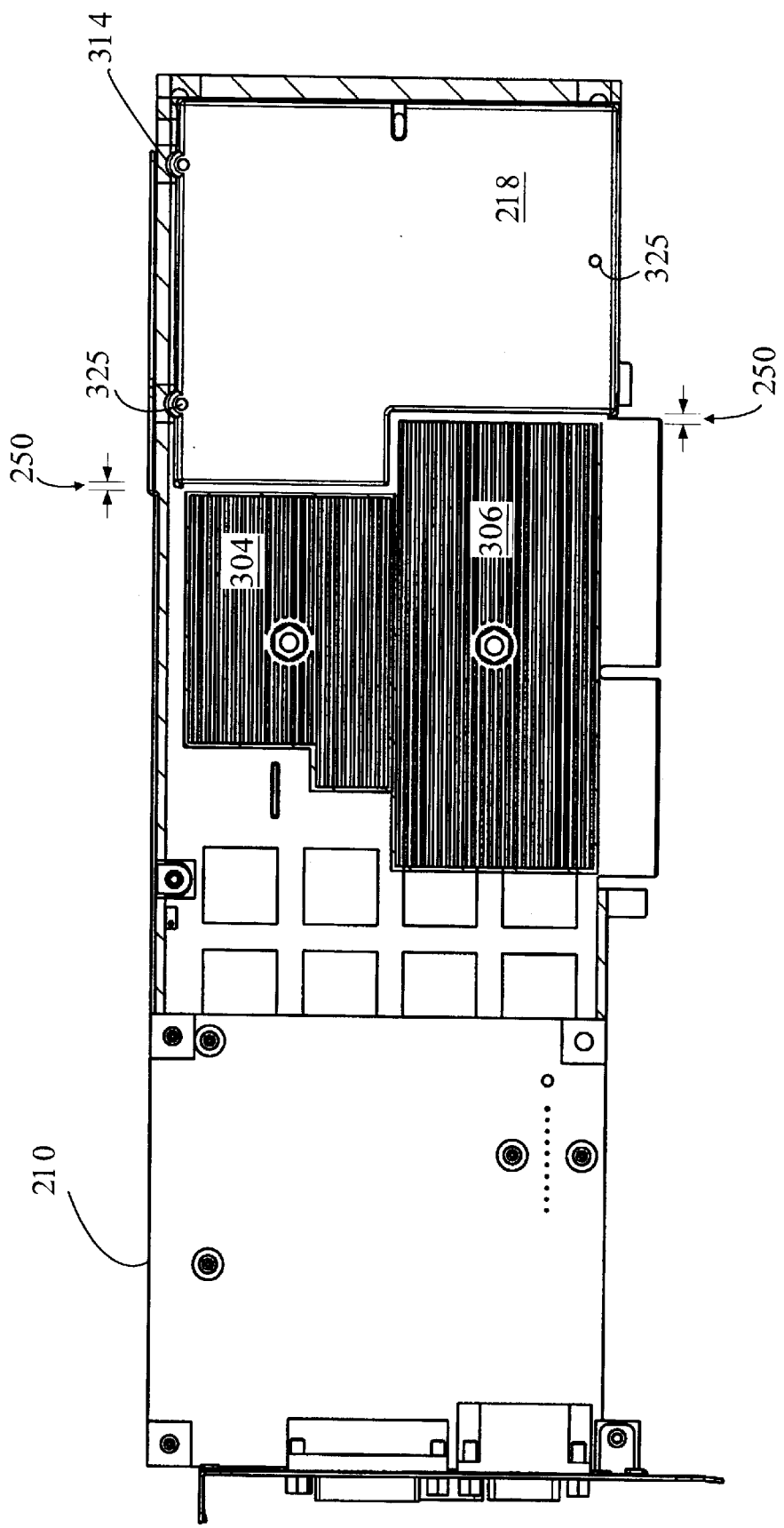
FIG. 3B schematically illustrates a side view of one embodiment of a printed circuit board of FIGS. 2 and 3A.

Referring to FIG. 3B, the illustrated embodiment of the printed circuit board 210, also shown in FIG. 3A, includes a plurality of devices mounted thereon, including semiconductor devices 300, 302, below and covered by the pair of heatsinks 304, 306. The heatsinks 304, 306 are coupled to the semiconductor devices 300, 302 via post assemblies 308, 310 (shown in FIG. 3A).

The shroud 218 is shown extending up to the heatsinks 304, 306 with the distance 250 therebetween. The shroud 218 is mounted to the printed circuit board 210 via screws 325 passing through the openings 313 (shown in FIG. 3A) in the printed circuit board 210 and interacting with boreholes formed in enlarged regions 314 of the sidewalls 311 (shown in FIG. 3A) of the shroud 218.

Generally, the heatsinks 304, 306 are enclosed on three sides, top, bottom, and below as shown here. In the illustrated embodiment, the shroud 218 does not have sidewalls 311 adjacent end portions 316, 318 such that airflow is allowed to pass therethrough. It should be appreciated that air flowing through the shroud 218 via the open-end portions 316, 318 also passes over and through the heatsinks 304, 306. Those skilled in the art will appreciate that the end walls adjacent end portions 316, 318 need not be entirely absent, but rather, may have openings formed therein to allow airflow through the shroud 218 adjacent the heatsinks 304, 306.

Figure 4:
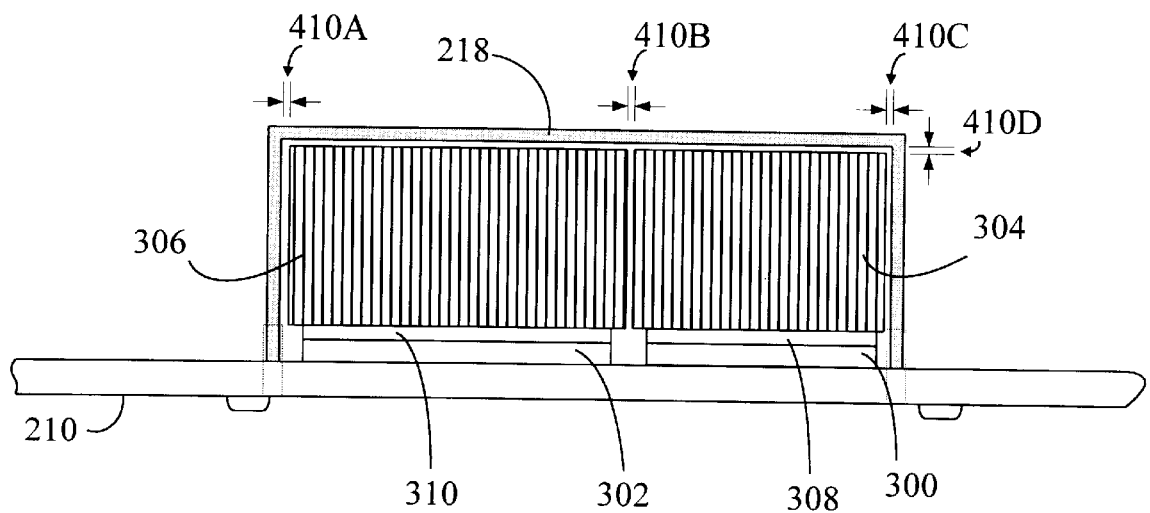
FIG. 4 illustrates an end view of one embodiment of the printed circuit board and shroud of FIGS. 2–3B.

A better appreciation of the relative positions of the shroud 218 and the heatsinks 304, 306 may be had by reference to FIG. 4, where a stylized end view of the shroud 218 and the printed circuit board 210 is shown, as assembled. The heatsinks 304, 306 are shown closely mated with the semiconductor devices 300, 302 via the post assemblies 308, 310. Relatively small gaps 410A, 410B, 410C, 410D remain between the heatsinks 304, 306 and the interior surfaces of the shroud 218 such that air flowing through the shroud 218 is forced to pass either through the heatsinks 304, 306 or adjacent thereto so that the airflow effectively cools the heatsinks 304, 306, and resultantly, the semiconductor devices 300, 302.

In the illustrated embodiment, the gaps 410A, 410B, 410C, 410D are approximately the same size or smaller than the spacing between the fins of the heatsinks 304, 306. In other embodiments, one or more of the gaps 410A, 410B, 410C, 410D may be zero or even non-existent. In an embodiment where the shroud 218 is adjacent to the heatsinks 304, 306, similar to the embodiment shown in FIG. 3B, the height of the shroud 218, as measured from the printed circuit board 210, may be at, or even below, the height of the heatsinks 304, 306, also measured from the printed circuit board 210. In this embodiment, the gaps 410A and 410C may also be zero or non-existent. In an embodiment similar to the one shown second in FIG. 2, where the shroud 218 extending over at least a portion of the heatsinks 304, 306, the height of the shroud 218 will be slightly taller than the height of the heatsinks 304, 306, with the gap 410D allowing for some clearance from the heatsinks 304, 306. The gap 410D will be non-zero when the shroud 218 is made of a material that could melt and create a hazardous condition.

The semiconductor devices 300, 302 are illustrated as being directly mounted on the printed circuit board 210;

however, those skilled in the art will appreciate that a variety of mounting arrangements may be utilized without departing from the scope of the instant invention. For example, the semiconductor devices 300, 302 may be mounted to the printed circuit board 210 via a variety of connectors, such as edge connectors, sockets, ball grid array mechanisms, zero insertion force sockets, and the like.

It should be appreciated that the shroud 218 may take on any of a variety of geometric configurations. In the illustrated embodiment, the shroud 218 is generally a polyhedron or parallelepiped, but could take on a variety of other configurations. For example, the shroud 218 could be generally arcuate or curved in configuration. In some embodiments, it may be useful to have at least the inner surfaces of the shroud 218 to have a shape at least partially conformal with the shape of the heatsink 304 or 306 located therein. For example, if the shape of the heatsink 304 or 306 is generally curved, then the interior shape of the shroud 218 may be similarly shaped.

It should also be appreciated that the gaps 410A, 410B, 410C, and 410D need not all be the same width. Any or all of the gaps 410A, 410C, and 410D will be non-existent when the shroud 218 is positioned adjacent to the heatsinks 304, 306, with or without the distance 250, and the dimensions of the shroud 218, as viewed in FIG. 4, are the same or smaller than the respective dimensions of the heatsinks 304, 306, as shown.

Figure 5A:
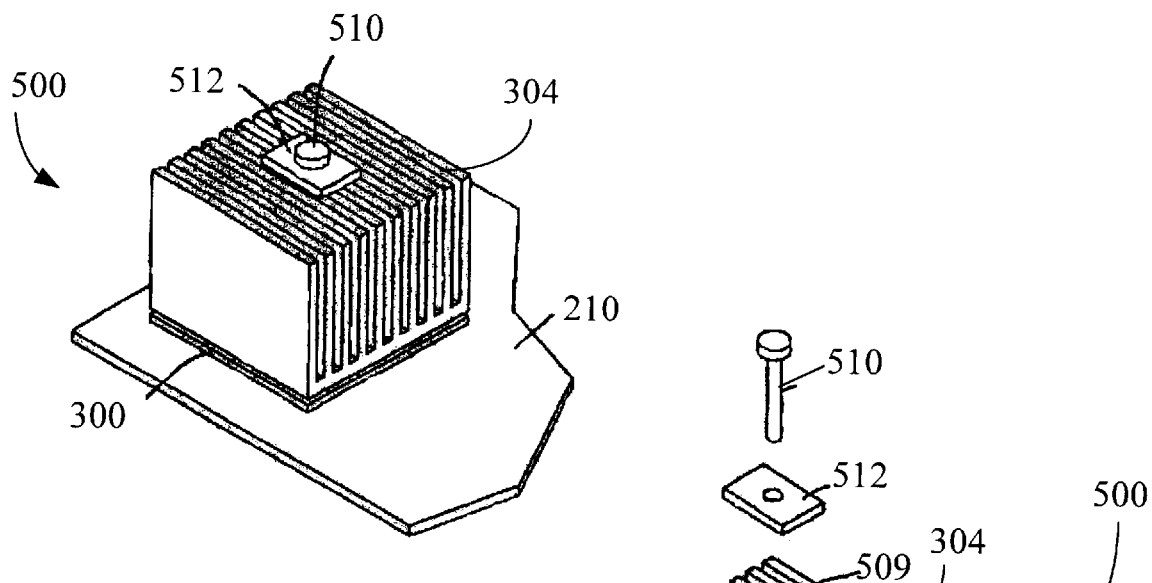
FIGS. 5A and 5B illustrate an assembled view and an exploded perspective view, respectively, of one embodiment of a heatsink of FIGS. 3A–4.
Figure 5B:
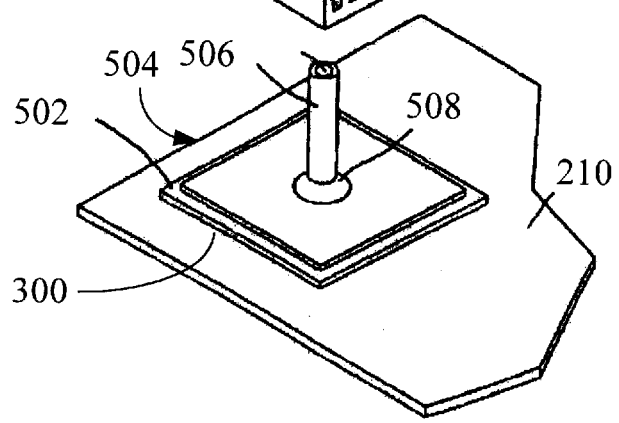

Referring now to FIGS. 5A and 5B, an assembled and an exploded perspective view, respectively, of one embodiment of a heatsink assembly 500 that may be used in the apparatus disclosed in FIGS. 3-4 is shown. The integrated circuit package or semiconductor device 300 has a relatively low profile and is mounted substantially flush with the printed circuit board 210. An upper surface 502 of the integrated circuit package 300 is substantially planar, and receives thereon a mechanism 504 to assist in mounting the heatsink 304 onto the integrated circuit package 300.

The mechanism 504 is comprised of a post 506 and a base 508. The post 506 and base 508 may be formed as a single unitary device or may be separate items joined together by any of a variety of mechanisms, including gluing, welding, soldering, screwing, press fitting, and the like. The base 508 may be attached to the integrated circuit package 300 by a variety of mechanisms, such as by an epoxy or cement. The post 506 extends at least partially through an opening 509 in the heatsink 304. A fastener 510, such as a bolt, screw, rivet, or the like similarly extends into the opening 509 through a washer 512 and engages the post 506. In the illustrated embodiment, the post 506 has a threaded opening formed in its distal end portion for receiving the fastener 510. The fastener 510 may be secured into the post 506, such as by screwing, to firmly couple the heatsink 304 with the mechanism 504 and, resultantly, the integrated circuit package 300.

It is envisioned that any of a variety of mechanisms may be utilized to couple the heatsink 304 with the integrated circuit package 300 without departing from the scope of the instant invention. The illustration of the particular mechanism 504 shown herein is by way of example only, and is not intended to limit the scope of the instant invention unless specifically recited in the claims.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed is:

1. An apparatus for removing heat from a first device and a second device mounted on a printed circuit board, comprising:
    a first heatsink coupled to the first device;
    a second heatsink coupled to the second device; and
    a shroud coupled to the printed circuit board and extending up to the first heatsink and the second heatsink, the shroud having a generally polyhedron configuration with openings positioned substantially opposite one another for directing airflow through the shroud and towards the first heatsink and the second heatsink;
    wherein an edge of the first heatsink is misaligned with respect to an edge of the second heatsink and wherein an edge of the shroud that forms at least a portion of the perimeter of one of the openings is shaped to abut against the misaligned edges of the first heatsink and the second heatsink.

2. The apparatus, as set forth in claim 1, wherein the shroud is formed from a material comprised of one or more of a plastic, an organic plastic, a metal, or a paper product.

3. The apparatus, as set forth in claim 1, wherein the shroud includes a first and second sidewall joined by a top surface, and the first and second sidewalls are coupled to the printed circuit board.

4. The apparatus, as set forth in claim 3, wherein the top surface is generally planar.

5. The apparatus, as set forth in claim 3, wherein the top surface is generally arcuate.

6. The apparatus, as set forth in claim 3, wherein the first and second sidewalls include at least one opening formed therein to receive a screw therein, wherein the screw extends through the printed circuit board and into the opening to couple the sidewall to the printed circuit board.

7. The apparatus, as set forth in claim 3, wherein the first and second sidewalls include at least one enlarged region with an opening formed therein to receive a screw therein, wherein the screw extends through the printed circuit board and into the opening to couple the sidewall to the printed circuit board.

8. The apparatus, as set forth in claim 1, wherein the shroud extends over at least a portion of the first heatsink.

9. The apparatus, as set forth in claim 1, wherein, in the dimension substantially perpendicular to a surface of the printed circuit board, the shroud is taller than the first heatsink by about, or less than, a characteristic dimension of the first heatsink.

10. The apparatus, as set forth in claim 1, wherein, in the dimension substantially perpendicular to a surface of the printed circuit board, the first heatsink is taller than the shroud.

11. The apparatus, as set forth in claim 1, wherein, in the dimension substantially perpendicular to a line joining the at least two openings, the shroud is wider than the first heatsink by about, or less than, a characteristic dimension of the first heatsink.

12. The apparatus, as set forth in claim 1, wherein, in the dimension substantially perpendicular to a line joining the at least two openings, the first heatsink is wider than the shroud.

\* \* \* \* \*